(12) United States Patent
Nishiyama et al.

(10) Patent No.: US 6,507,385 B1
(45) Date of Patent: Jan. 14, 2003

(54) LIQUID CRYSTAL DISPLAY ELEMENT AND MANUFACTURING METHOD THEREOF

(75) Inventors: Seiji Nishiyama, Hirakata (JP); Kenji Nakao, Osaka (JP); Tsuyoshi Uemura, Kadoma (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/562,602

(22) Filed: May 1, 2000

(30) Foreign Application Priority Data

Apr. 30, 1999 (JP) .......................................... 11-124011

(51) Int. Cl.[7] .......................................... G02F 1/1339
(52) U.S. Cl. .......................................... 349/156
(58) Field of Search ................................ 349/155, 156, 349/84

(56) References Cited

U.S. PATENT DOCUMENTS 5,499,128 A * 3/1996 Hasegawa et al. ............ 359/81
6,184,954 B1 * 2/2001 Inoue et al. ................... 349/86

* cited by examiner

Primary Examiner—Kenneth Parker
(74) Attorney, Agent, or Firm—Parkhurst & Wendel, L.L.P.

(57) ABSTRACT

A liquid crystal display element of the present invention comprises a pair of substrates 1, 2 with transparent electrodes 5, 6, a spacer 3 for maintaining a certain gap between the substrates, which is disposed between the pair of substrates 1, 2, and a liquid crystal layer 4 sealed between the substrates 1, 2; in which the spacer 3 has an elasticity, the sum of a repulsion force of the spacer 3 and an internal pressure of the above-mentioned liquid crystal layer 4 is constantly approximately 1 atm with a change in temperature within a range of usable temperatures of the liquid crystal display element, and each of the spacer 3 and the internal pressure of the liquid crystal layer 4 varies linearly. According to such a constitution, it is possible to improve a temperature characteristic of the grade of display resulting from a firm column-shaped spacer with little elasticity, and to realize a liquid crystal display element with little deterioration in the grade of display due to a change in temperature.

1 Claim, 15 Drawing Sheets

(a)

(b)

US 6,507,385 B1

LIQUID CRYSTAL DISPLAY ELEMENT AND MANUFACTURING METHOD THEREOF

BACKGROUND OF THE INVENTION (1). Field of the Invention

The present invention relates to a liquid crystal display element, which is utilized for an optical shutter and the like, and a manufacturing method thereof.

(2). Description of the Prior Arts

A conventional and general liquid crystal display element, wherein a twisted nematic liquid crystal material (hereinafter referred to as "TN liquid crystal") and an active matrix mode are combined, changes an alignment state of a liquid crystal molecule according to the applied voltage by holding the TN liquid crystal between two substrates with an electrode and applying voltage between the above-mentioned substrates. Light transmittance in a liquid crystal molecule changes according to an alignment state. Thus, a mode (a longitudinal electric field type) in which light transmittance is controlled by voltage is used for TN liquid crystal. A liquid crystal display element is composed of an active matrix substrate with a switching element for controlling whether voltage is applied or not, typically a thin film transistor hereinafter referred to as "TFT"), and a pixel electrode; an opposite substrate; a liquid crystal sealed between both substrates; and a polarizer disposed outside both substrates. An alignment state of a liquid crystal molecule is changed by an applied voltage between electrodes on both of the substrates, and thereby light transmittance is changed However, in such a general liquid crystal display element, optical activity of transmitted light for an observer changes according to viewing angle, namely, an angle with a screen, and consequently brightness is affected. For instance, an image with a high contrast ratio is observed in the case of viewing from a front direction vertical to a screen with a white display, namely, a normal direction to the screen, while an image is observed dark in the case of viewing the screen from an oblique direction below the normal direction. When the screen is viewed from a much lower direction, the phenomenon of tone reversal, wherein brightness and darkness are reversed, occurs. When the screen is viewed from an upper oblique direction, an image is observed white. This phenomenon occurs for the reason that a direction, in which a liquid crystal molecule is set up, is determined in a display mode wherein optical activity is controlled by applying electric field to liquid crystal in a normal direction to a substrate and setting up a liquid crystal molecule along a direction of the electric field. Since a multitude of micro globes 'spacer' is scattered for obtaining the uniformity of cell thickness, the unevenness occurs easily on a screen, whereby the grade of display is badly affected.

Recently, a lateral electric field type has been noticed as a means of improving such a problem of viewing ankle. As described above, in a conventional liquid crystal display element, electric field is applied in a normal direction to a substrate and an alignment state of liquid crystal is controlled, while a lateral electric field type is a mode of controlling by an electric field in a lateral direction parallel with a substrate. This mode supplies a wide viewing angle in principle, and is considered as an idea for improving with a highest effect because of little change in color tone. Thus, although a viewing angle of a lateral electric field type liquid crystal display element is greatly wider than that of a longitudinal electric field type, the element has a wide area of shielding such as a common electrode, a source electrode and a switching element, therefore an aperture ratio of a pixel has no choice but to become lower than a conventional TN type. Consequently, a bad influence of many spacer particles, which is scattered for obtaining the cell thickness, on the grade of display is greater than a conventional TN mode.

In order to solve these problems and to obtain a fine grade of display, the following methods have been employed. a column-shaped spacer is formed in an area of shielding on an active matrix substrate with such a switching element as TFT; and a column-shaped spacer is formed in an area of shielding, typically a black matrix in a pixel part of a color filter.

In a conventional TN type, a structure, in which it is unnecessary to scatter spacer particles, has been proposed. For instance, a liquid crystal display element, wherein a spacer support is formed by joining together projections provided on both of an active matrix substrate and a substrate with a color filter, has been proposed in Japanese Unexamined Patent Publication No. 7-281295.

As regards a lateral electric field type, a liquid crystal display element using no spacer particles has been proposed in Japanese Unexamined Patent Publication No. 6-214244. In the liquid crystal display element, both of a common electrode and a pixel electrode (a source electrode) are formed while setting up vertically to a substrate, and both of the electrodes serve as a spacer (a support). Therefore, spacer particles are not necessary.

A conventional liquid crystal display element, wherein a polymer dispersed liquid crystal material (hereinafter referred to as 'PDLC') and an active matrix substrate with such a switching element as TFT are combined, has a constitution in which a liquid crystal layer, wherein a liquid crystal molecule is dispersed in a droplet or a network into polymer hereinafter referred to as 'polymer matrix') with a matrix structure, is held between two substrates with an electrode. A molecular structure of both is designed in advance so that a refractive index of a liquid crystal molecule aligned in an applied direction is equal to that of the above-mentioned polymer matrix under an application of voltage. Since refractive indexes of the liquid crystal molecule and the polymer matrix are equal under an application of voltage, an incident light into a PDLC layer becomes a transmitted light. On the other hand, the liquid crystal molecule is aligned in a disorderly direction under no application of voltage. Consequently, refractive indexes of the liquid crystal molecule and the polymer matrix are ordinarily unequal, and thereby an incident light into a PDLC layer becomes a scattered light. Thus, a transmitting state and a scattering state of an incident light are switched in PDLC by whether voltage is applied or not.

Also in a conventional polymer dispersed liquid crystal display element, a multitude of micro globes 'spacer' is scattered for obtaining the cell thickness to realize a fine grade of display. The spacer in the polymer dispersed liquid crystal display element is used for a projection display for enlarging and projecting on a screen an image of light projected from a lamp with a high luminance, and a reflection display for displaying an external light by utilizing a reflector provided inside the liquid crystal display element.

A dispersion density of spacers in a liquid crystal layer can be lowered in appearance by providing a spacer beforehand in an area of shielding on a substrate used for conventional TN type liquid crystal display element or lateral electric field type liquid crystal display element. However, on the contrary, the problem is a deterioration in the grade of display due to a change in temperature. This is described below referring to FIG. 12.

The problem is a low-temperature foaming during a change from room temperature to low temperature. When a liquid crystal display element 100 is left at a low temperature, the volume of a liquid crystal molecule contracts. Then, the cell thickness needs to contract, namely, thin in the thickness direction according to the volume contraction of the above-mentioned liquid crystal molecule. A low-temperature foaming 108 is a phenomenon wherein a vacuum foam is caused in a liquid crystal layer since the cell thickness can not follow such volume contraction of the liquid crystal molecule. When a spacer 105 formed on a substrate by patterning is firm, the low-temperature foaming 108 is caused easily since the contraction of the cell thickness according to the volume contraction of a liquid crystal 104 at a low temperature is hindered by the above-mentioned spacer 105. A spacer with a proper elasticity is preferable in terms of the follow-up of the cell thickness at such a low temperature and the maintenance of a fine grade of display having no unevenness on a screen. The problem is a display spottiness during a change from room temperature to high temperature. This results from an increase in the nonuniformity of the cell thickness due to a rise in temperature. A liquid crystal molecule sealed in a liquid crystal display element expands by heating. As a result of the expansion of the liquid crystal molecule due to a rise in temperature, the volume of the liquid crystal molecule increases inside the liquid crystal display element.

An increase in the volume causes a change in the gap between substrates, namely, a change in the cell thickness. Then, in a conventional liquid crystal display element, a column-shaped spacer can not follow an increase in the cell thickness. Consequently, the problem is that since a change in the cell thickness is controlled by the thermal expansion of the liquid crystal molecule, the nonuniformity of the cell thickness increases and the equality in the grade of display is lost.

Moreover, in the case of using a polymer dispersed liquid crystal display element, particularly, a projection display for enlarging and projecting on a screen an image of light from a light source projected onto a liquid crystal display element, a spacer is enlarged for maintaining the cell thickness. A PDLC projection display is in a light scattering mode (black display mode), namely, a normally black mode under no application of voltage. Then, when a conventional globular spacer without coloring is used, the scattering of light does not occur in an area wherein the spacer is scattered and light transmits trough the spacer. Consequently, a black luminance in a black display becomes higher in proportion to a dispersion density of the above-mentioned globular spacers, whereby a deterioration in contrast on a screen is caused In order to restrain such a deterioration in contrast due to a rise in a black luminance resulting from the transmission through a spacer under no application of voltage, a spacer comprising a black colorant or a colorant for shielding is occasionally used. Although a deterioration in contrast is restrained by preventing the transmission of light with the spacer comprising a colorant, another problem is noticed. The equality of display in a high gray scale is important for maintaining a higher contrast. Consequently, it is necessary to improve the uniformity of the cell thickness. A dispersion density of the spacers needs to be raised for improving the uniformity of the cell thickness. When a dispersion density of the spacers is raised, the spacers touch each other during scattering and form a lump easily. Therefore, the unevenness occurs easily on a screen. Since the spacer is enlarged, the unevenness occurs easily under an application of voltage. Thus, a shape and a characteristic of the spacer have a problem in maintaining a fine grade of display in consideration of contrast and gray scale.

The problem is a reliability at storage temperature, namely, a reliability when left at a high temperature in a conventional combination of a spacer formed directly on a substrate and a polymer dispersed liquid crystal display element. In the above-mentioned polymer dispersed liquid crystal display element, the following problem is caused by an abrupt change in temperature. This is described below referring to FIG. 13.

FIG. 13(a) shows a state of a liquid crystal display element 200 in the case of normal temperature (such as 20° C.). In FIG. 13(a), a spacer 206 comes under little pressure by glass substrates 201 and 202 since the size of the spacer 206 is equal to the gap.

FIG. 13(b) shows a state of a liquid crystal display element in the case of high temperature (such as 85° C.). In this case, the volume of a polymer matrix 205 and a liquid crystal 204 expands by heating, and the internal pressure of a liquid crystal layer 209 increases. Because of not being fixed by a seal member 203 unlike the peripheral part, the middle part of the glass substrates 201 and 202 is transformed as shown in FIG. 13(b) under the influence of the increased internal pressure, and thereby the gap becomes wider at a nearer point to the middle part away from the peripheral part. As a result, the expanded liquid crystal 204 concentrates in the middle part.

In returning abruptly from a state of FIG. 13(b) to normal temperature, the liquid crystal layer 209 contracts. Then, the liquid crystal concentrating in the middle part can not completely return to an initial state, and most of the liquid crystal is left in the middle part. Consequently, as shown in FIG. 13(c), the gap between the glass substrates 201 and 202 is different at each point. Thus, in a conventional polymer dispersed liquid crystal display element, the variation in the thickness of a liquid crystal layer is caused by the expansion and contraction of the liquid crystal layer due to an abrupt change in temperature. As a result, the problem is a dramatic deterioration in the grade of display.

[The Problems in a Conventional Example]

The summary of the above-mentioned problems in a conventional example is as follows:

(1) In a TN mode liquid crystal display element, the grade of display is deteriorated in using at a low temperature, resulting from a low-temperature foaming due to an abrupt change in temperature from room temperature to low temperature.

(2) In a TN mode liquid crystal display element and a polymer dispersed liquid crystal display element, the grade of display is deteriorated in using at a high temperature, resulting from the nonuniformity of the cell thickness.

(3) When a polymer dispersed liquid crystal display element is left in a state of an abrupt change in temperature, the nonuniformity of the thickness of a liquid crystal layer is caused by the expansion and contraction of the liquid crystal layer, and thereby the grade of display is deteriorated (4) Resulting from a rise in a dispersion density of the spacers and the disposition of the spacers, the unevenness occurs on a screen and the grade of display is deteriorated.

SUMMARY OF THE INVENTION

The purpose of the present invention, in view of the above-mentioned problems in the Prior Arts, is to improve a temperature characteristic of the grade of display resulting from a firm column-shaped spacer with little elasticity, and to provide a liquid crystal display element with little deterioration in the grade of display due to a change in temperature and a manufacturing method thereof For further details, the purpose is to provide a liquid crystal display element with a fine grade of display and no low-temperature foaming in using at a low temperature, wherein the spacer can follow the contraction of a liquid crystal molecule due to an abrupt change in temperature from room temperature to low temperature.

The purpose is to provide a liquid crystal display element with a fine grade of display and the uniformity of the cell thickness in using at a high temperature.

The purpose is to provide a polymer dispersed liquid crystal display element with a high grade of display, wherein a low-temperature foaming and the nonuniformity of the cell thickness at a high temperature do not occur in a range of usable temperatures.

The purpose is to provide a polymer dispersed liquid crystal display element with a fine grade of display, wherein the nonuniformity of the thickness of a liquid crystal layer is not caused by the expansion and contraction of the liquid crystal layer when left in a state of an abrupt change in temperature.

The purpose is to provide a liquid crystal display element with a fine grade of display and no unevenness, which corresponds to high contrast and gray scale by forming a column-shaped spacer (which means nonglobular spacers) in advance in an area of shielding on an active matrix substrate or an opposite substrate.

In addition, the purpose is to provide a method of manufacturing the above-mentioned liquid crystal display element.

In order to achieve the above-mentioned purpose, the present invention comprises the following means.

The invention according to claim 1 of the present invention is characterized by a liquid crystal display element comprising a column-shaped spacer for maintaining a certain gap between the substrates, which is disposed between a pair of substrates; and a liquid crystal layer sealed between the substrates; wherein the above-mentioned spacer has an elasticity; and the sum of a repulsion force of the above-mentioned spacer and an internal pressure of the above-mentioned liquid crystal layer is constantly approximately equal to atmospheric pressure with a change in temperature within a range of usable temperatures of the liquid crystal display element.

According to the above-mentioned constitution, the spacer can constantly be deformed elastically within a range of usable temperatures of the liquid crystal display element. Consequently, it is possible to prevent the low-temperature foaming phenomenon and the nonuniformity of the cell thickness at a high temperature, and to intend to improve the grade of display.

A dispersion density of spacers can be determined at a range having no unevenness on a screen by providing a proper elasticity for a spacer. The improvement of the grade of display can be intended from such a viewpoint.

A polymer dispersed liquid crystal layer as well as a TN type liquid crystal layer and an STN type liquid crystal layer may be used as a liquid crystal layer.

The invention according to claim 2 is characterized by a liquid crystal display element according to claim 1, wherein the sum of a repulsion force of the above-mentioned spacer and an internal pressure of the above-mentioned liquid crystal layer is constantly approximately equal to atmospheric pressure; and each of the spacer and the internal pressure of the liquid crystal layer varies linearly.

As described above, when each of the spacer and the internal pressure of the liquid crystal layer varies linearly, the uniformity of the cell thickness is improved greatly.

The invention according to claim 3 is characterized by a liquid crystal display element comprising a column-shaped spacer for maintaining a certain gap between the substrates, which is disposed between a pair of substrates; and a liquid crystal layer sealed between the substrates; wherein the above-mentioned spacer has an elasticity; and the sum of a repulsion force of the above-mentioned spacer and an internal pressure of the abovementioned liquid crystal layer is constantly approximately equal to atmospheric pressure with a change in temperature within a range from normal temperature to the highest usable temperature of the liquid crystal display element.

According to the above-mentioned constitution, it is possible to prevent the nonuniformity of the cell thickness at a high temperature, and to intend to improve the grade of display.

The invention according to claim 4 is characterized by a liquid crystal display element according to claim 3, wherein the sum of a repulsion force of the above-mentioned spacer and an internal pressure of the above-mentioned liquid crystal layer is constantly approximately equal to atmospheric pressure; and each of the spacer and the internal pressure of the liquid crystal layer varies linearly According to the above-mentioned constitution, the uniformity of the cell thickness at a high temperature is improved greatly.

The invention according to claim 5 is characterized by a polymer dispersed liquid crystal display element comprising a column-shaped spacer for maintaining a certain gap between the substrates, which is disposed between a pair of substrates; and a polymer dispersed liquid crystal layer composed of a liquid crystal and a polymer, which is sealed between the substrates; wherein the above-mentioned spacer has an elasticity; and the sum of a repulsion force of the above-mentioned spacer and an internal pressure of the above-mentioned liquid crystal layer is constantly approximately equal to atmospheric pressure with a change in temperature within a range of storage temperatures of the liquid crystal display element.

According to the polymer dispersed liquid crystal display element having the above-mentioned constitution, the spacer can constantly be deformed elastically within a range of storage temperatures. Consequently, it is possible to prevent the deformation of the gap between the substrates (the nonuniformity of the thickness of the liquid crystal layer) from being caused by an abrupt change in temperature and to maintain a certain cell thickness, and to intend to improve the grade of display.

The invention according to claim 6 is characterized by a polymer dispersed liquid crystal display element according to claim 5, wherein the sum of a repulsion force of the above-mentioned spacer and an internal pressure of the above-mentioned liquid crystal layer is constantly approximately equal to atmospheric pressure; and each of the spacer and the internal pressure of the liquid crystal layer varies linearly.

As described above, when each of the spacer and the internal pressure of the liquid crystal layer varies linearly, the uniformity of the cell thickness is improved greatly.

The invention according to any one of claim 7 and 8 is characterized in that the above-mentioned spacer is formed directly on at least one of the above-mentioned pair of substrates by a patterning process.

According to the above-mentioned constitution, it is possible to obtain a spacer for which a desirable elasticity is provided in consideration of the size and the dispersion density of the spacer The invention according to any one of claims 9 and 10 is characterized in that the above-mentioned spacer comprises a kind of material or a composite material consisting of two or more kinds of materials among a polystyrene-based polymer compound, an acryl-based polymer compound, a polyester-based polymer compound, a silicon -based polymer compound, a polycarbonate-based polymer compound, a polysiloxane-based polymer compound, a polyethylene-based polymer compound, and a polyurethane-based polymer compound.

The invention according to any one of claims 11 and 12 is characterized in that the above-mentioned spacer is formed in a shape with a thin tip from a substrate toward the other substrate.

According to the above-mentioned constitution, an elastic spacer with a desirable elasticity can be obtained.

The invention according to any one of claims 13 and 14 is characterized in that the above-mentioned spacer has a structure, in which the whole or a part of the spacer is hollow, between the above-mentioned pair of substrates.

According to the above-mentioned constitution, an elastic spacer with a desirable elasticity can be obtained The invention according to any one of claims 15 and 16 is characterized in that the above-mentioned spacer has a distribution of length in a normal direction between the above-mentioned pair of substrates.

The invention according to any one of claims 17 and 18 is characterized in that the above-mentioned spacer has a distribution comprising an average and a variance in length in a normal direction between the above-mentioned pair of substrates; and the variance is in a range of approximately 3 to 6% of the average.

According to the above-mentioned constitution, the most proper elasticity can be provided for a spacer in consideration of a distribution of the height of the spacer The invention according to any one of claims 19 and 20 is characterized in that a dispersion density of the above-mentioned spacer is in a range of approximately 5 to 2000/mm$^2$.

According to the above-mentioned constitution, the most proper elasticity can be provided for a spacer in consideration of a distribution of the dispersion density of the spacer.

The invention according to any one of claims 21 and 22 is characterized in that the above-mentioned spacer is formed in an area of shielding on at least one of the above-mentioned pair of substrates.

According to the above-mentioned constitution, an aperture ratio is improved.

The invention according to any one of claims 23 and 24 is characterized in that an internal pressure of the above-mentioned liquid crystal layer is in a range of approximately 0 to 0.9 kgf/cm$^2$.

When the spacer is in a state of elastic deformation, the internal pressure of the liquid crystal layer is lower than atmospheric pressure. Accordingly, a state of elastic deformation in the spacer can be determined by the internal pressure of the liquid crystal layer.

The invention according to claim 25 is characterized by a method of manufacturing a liquid crystal display element comprising a column-shaped spacer for maintaining a certain gap between the substrates, which is disposed between a pair of substrates; and a liquid crystal layer sealed between the substrates; comprising the steps of executing a treatment for providing an elasticity with a predetermined value for the spacers after forming a plurality of spacers on at least one of the pair of substrates; forming the liquid crystal layer sealed between the pair of substrates with the spacers; and pressing the gap between the substrates equally at a pressure value of approximately 0.1 to 1.0 kgf/cm$^2$ simultaneously with or after the step of forming a liquid crystal layer.

The reason for controlling the force of pressing the substrates is that elastic deformation can not be caused in the spacer with a lower pressure value than 0.1 kgf/cm$^2$, while plastic deformation is caused in the spacer with a higher pressure value than 1.0 kgf/cm$^2$.

DESCRIPTION OF THE PREFERRED EMBODIMENTS

The embodiments of the present invention are described below based on FIGS.

Embodiment 1

Figure 1:
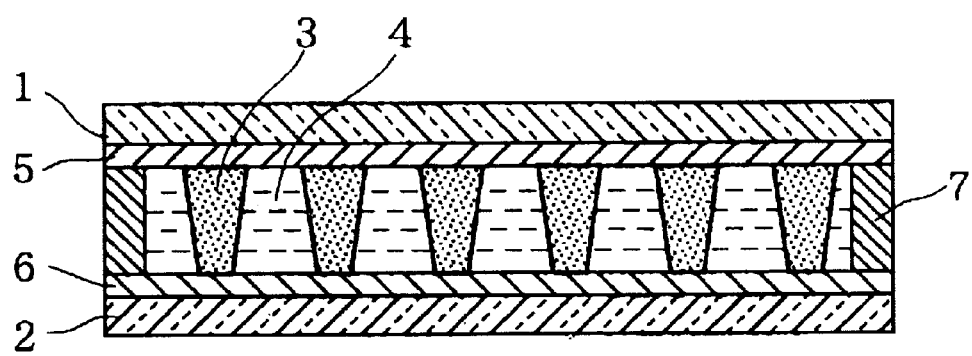
FIG. 1 is a cross sectional view of a liquid crystal display element according to Embodiment 1.

FIG. 1 is a simplified cross sectional view of a liquid crystal display element according to Embodiment 1. A liquid crystal display element comprises a pair of glass substrates 1, 2; a column-shaped spacer 3 for maintaining a certain gap between the substrates, which is disposed between the substrates 1, 2; and a liquid crystal layer 4 sealed between the substrates 1, 2. Each of transparent electrodes 5, 6 is formed inside the glass substrates 1, 2. In FIG. 1, 7 indicates a sealing part for fixing the substrates 1, 2 firmly and sealing the liquid crystal layer 4.

The above-mentioned spacer 3 has an elasticity and is in a state of elastic deformation within a range (0 to 85° C. in Embodiment 1) of usable temperatures of a liquid crystal display element. That is, the liquid crystal display element is constituted so that the sum of a repulsion force of the above-mentioned spacer 3 and an internal pressure of the above-mentioned liquid crystal layer 4 is constantly approximately 1 atm with a change in temperature within a range of usable temperatures of the above-mentioned display element, and each of the spacer 3 and the internal pressure of the liquid crystal layer 4 varies linearly. According to such a constitution, a display with no low-temperature foaming can be obtained in using at a low temperature and a display with no nonuniformity of the cell thickness can be obtained in using at a high temperature, therefore the grade of display is improved. Although it is necessary to raise a dispersion density of the spacers for improving the uniformity of the cell thickness, the spacer 3 in the present invention has a proper elasticity, and thereby it is not necessary to raise a dispersion density of the spacers to a conventional level, and a dispersion density of the spacers can be determined at a range having no unevenness on a screen. Accordingly, the satisfactory uniformity of the cell thickness is obtained, and the unevenness on a screen resulting from an increase in a dispersion density of the spacers can be prevented, and thereby the grade of display can be improved A method of manufacturing a liquid crystal display element having the above-mentioned constitution is described below.

First, the pair of substrates 1, 2 with the transparent electrodes 5, 6 are manufactured based on the same method as conventionally. Next, the spacer 3 is formed on the substrate 1.

Figure 2:
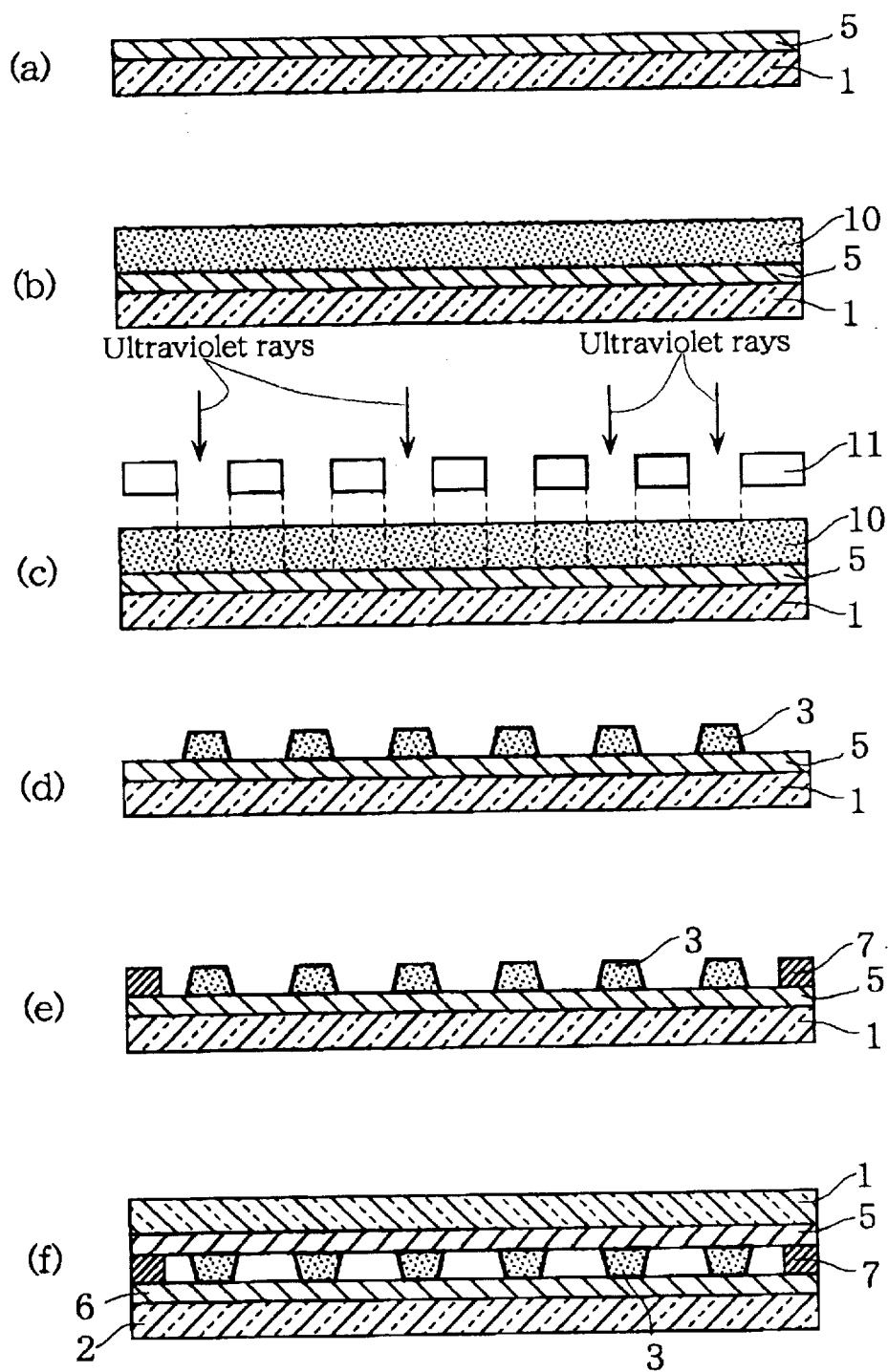
FIG. 2 is a view of manufacturing processes of a liquid crystal display element according to Embodiment 1.

A method of forming the spacer 3 is described concretely referring to FIG. 2. The step by using a photosensitive polymer comprising carbon on the substrate 1, on which the transparent electrode 5 is deposited, is described as an example. The concentration of acryl-based negative resist was adjusted so that a ratio of solid component is 38%, and 5% of carbon powder was mixed. The carbon powder is a means of coloring a column-shaped spacer black and has to be a substance which absorbs visible radiation A uniform resist film 10 was formed on the above-mentioned glass substrate 1 with a spinner FIG. 2(b)). The spinning was executed at a value of 1300 rpm for 30 seconds after 500 rpm for 5 seconds. Later, a pre-bake was executed at a temperature of 80° C. for 3 minutes. As shown in FIG. 2 (c), the column-shaped spacer 3 with a predetermined shape described below was formed by photolithography technology using a mask 11. Then, an intensity of UV irradiation was 15 mW/cm$^2$, and exposure time was 3 seconds.

Since a conventional column-shaped spacer has little elasticity and it is difficult to control the nonuniformity of the spacers, elasticity was provided for a spacer by the following methods in Embodiment 1.

Figure 3:
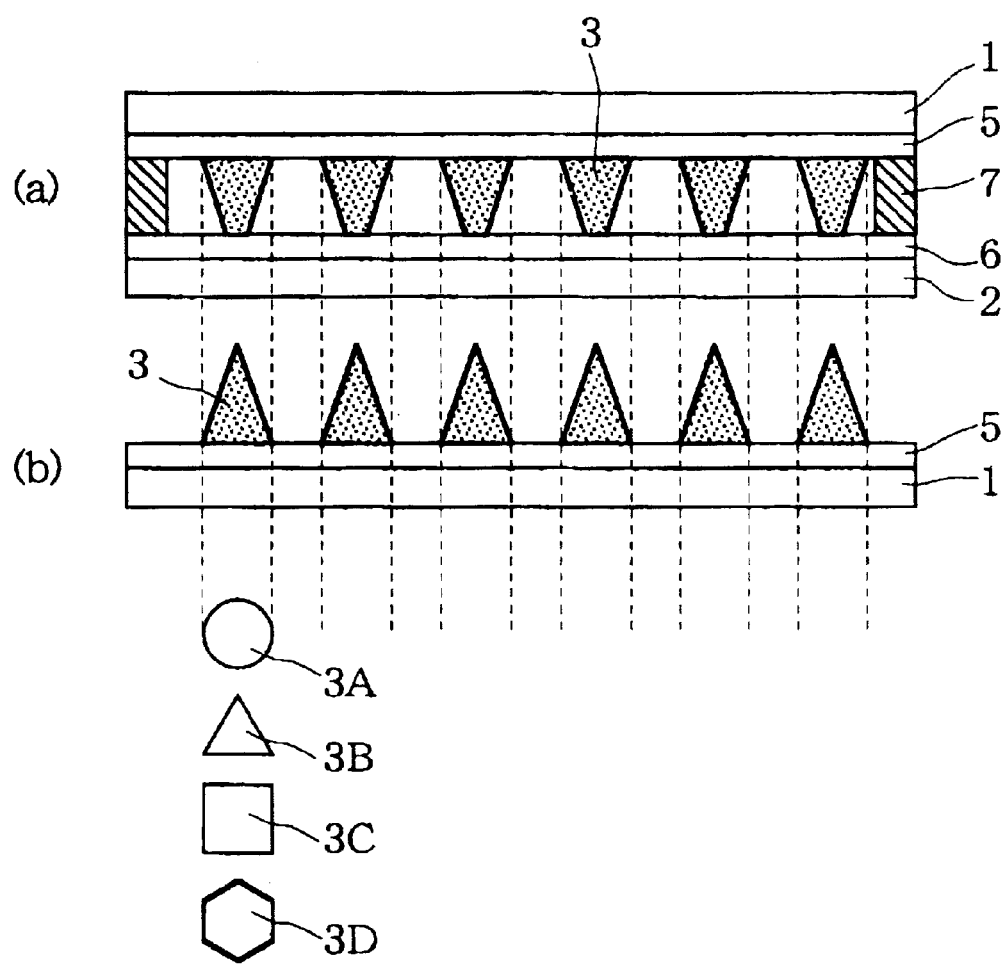
FIG. 3 is a view for describing a shape of a spacer used for a liquid crystal display element according to Embodiment 1.

The first method is a method of forming a spacer with a shape as shown in FIG. 3 in consideration of the conditions of development. FIG. 3(a) shows a spacer in a state of elastic deformation and FIG. 3(b) shows a spacer in a state before elastic deformation. Specifically, the method is a method of deforming the spacer 3 of a liquid crystal display element elastically in pressing by means of forming in advance the spacer having a structure, in which its cross section is smaller between the substrates, such as circular cone 3A, triangular pyramid 3B, quadrilateral pyramid 3C and multilateral pyramid 3D.

Figure 4:
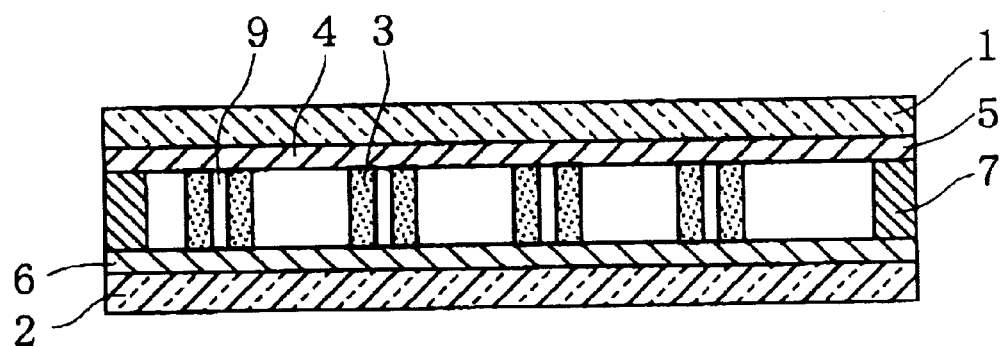
FIG. 4 is a view showing an example of a deformed spacer.

The second method is a method of deforming the spacer 3 of a liquid crystal display element elastically in pressing by making the whole or a part of the inside 9 of the spacer 3 hollow as shown in FIG. 4.

The third method is a method of making the spacer elastic by mixing rubber-based resin powder and silicon-based resin powder into a resist. Resin powder is effective with the mixture quantity of 3% or less and enables elastic deformation. Resin need not be limited to the above-mentioned resin, The fourth method is a method of reducing a degree of polymerzation of a resist. It can be realized to making the spacer elastic by reducing the concentration of a crosslinking agent in a resist.

The fifth method is a method of making both ends of the spacer column smaller.

Elasticity can be provided for a spacer by any of the above-mentioned methods.

Figure 5:
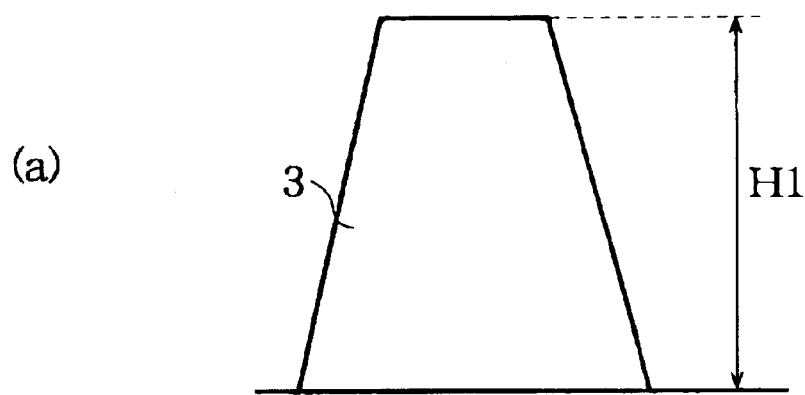
FIG. 5 is a view for describing a deformation quantity of a spacer.
Figure 5:
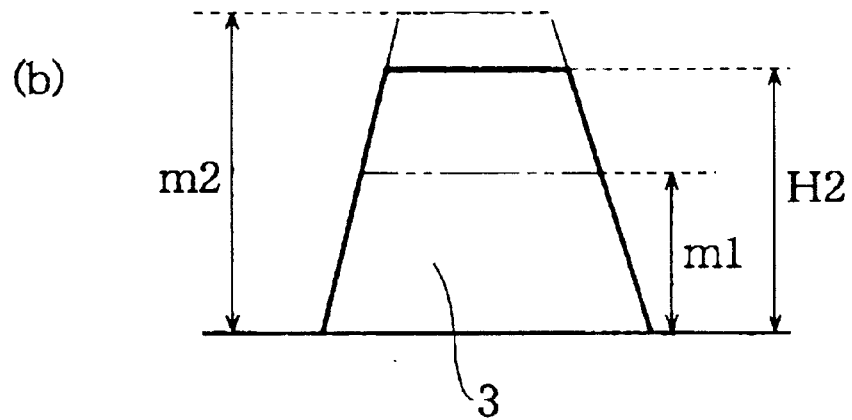

The above-mentioned first method, namely, the case of using the column-shaped spacer 3 in the shape of quadrilateral pyramid 3C is described in the following example. Specfically, the spacer 3 in the quadrilateral pyramid 3C with a bottom 5 $\mu$m square was formed by repeating the step of etching by photolithography technology. The concrete shape (such as, bottom area and natural length) of the spacer 3 in the quadrilateral pyramid 3C needs to be determined in consideration of a dispersion density of the spacers as well as so that an elasticity for maintaining a state of elastic deformation is provided at either of the highest temperature and the lowest temperature in a range of usable temperatures. For instance, the initial height of the column-shaped spacer 3 on a substrate is determined at H1 as shown in FIG. 5(a), and the height of the column-shaped spacer 3 is determined at H2 in a state (at normal temperature) shown in FIG. 5(b) of a predetermined cell thickness after pressing between the substrates. Then, when the length of the liquid crystal layer in a direction of the cell thickness becomes m1 due to the thermal contraction at the lowest temperature in a range of usable temperatures, the height of the column-shaped spacer 3 is changed to m1, and additionally the column-shaped spacer 3 needs to be in a state of elastic deformation at the height of m1. Similarly, when the length of the liquid crystal layer in a direction of the cell thickness becomes m2 due to the thermal expansion at the highest temperature in a range of usable temperatures, the height of the column-shaped spacer 3 is changed to m2 (m2<H1), and additionally the column-shaped spacer 3 needs to be in a state of elastic deformation at the height of m2. Meanwhile, when a dispersion density of the spacers is made too lower, the uniformity of the cell thickness deteriorates, whereas light leakage resulting from the spacers increases with a too high dispersion density of the spacers. Accordingly, the shape of the spacer 3 needs to be determined in consideration of such problems about a dispersion density of the spacers as well as so as to maintain a state of elastic deformation at either of the highest temperature and the lowest temperature in a range of usable temperatures.

Based on the above-mentioned ideas, a side of a bottom was determined at 5.00 μm, a height average at 4.70 μm, a variance at approximately 3%, and the dispersion density at approximately 300/mm² in Embodiment 1. Later, a post-bake was executed at a temperature of 200° C. Next, the sealing part 7 was printed in the peripheral part of a substrate (FIG. 3(e)). The pair of substrates 1, 2 with the transparent electrodes 5, 6 were pressurized and heated with an overlap of each other by using a pressing device, and thereby the sealing part 7 was cured (FIG. 3(f)). Later, the liquid crystal layer 4 was formed by injecting a liquid crystal material into a gap between the pair of substrates 1, 2 through an opening provided in a part of the sealing part 7.

Next, a liquid crystal display element was pressed to obtain a predetermined value of the cell thickness. The value F of pressing was determined at 0.3 kgf/cm². Then, the spacer 3 was partially in a state of elastic deformation.

The cell thickness of the liquid crystal display element manufactured by the above-mentioned steps had an average of 4.65 μm and a variance of 0.12 μm, therefore the visibility and contrast of the liquid crystal display element were greatly improved. Then, since a height average of the spacer on a substrate was 4.70 μm, it was found that some of the spacers were in a state of elastic deformation. A side of a bottom, a height average and the dispersion density of the column-shaped spacer 3 are not limited to the above-mentioned values. It is confirmed by the inventors of the present invention that the spacer performs the effect of following a change in temperature sufficiently, on condition that a side of a bottom is a value from 3 μm to 20 μm, a height average from 3 μm to 20 μm, and the dispersion density from 5/mm² to 2000/mm².

The description of the above-mentioned spacer 3 in the quadrilateral pyramid 3C applies to the case of providing elasticity for the column-shaped spacer a part of which is hollow. In the case of the hollow spacer, it is confirmed by the inventors of the present invention that the spacer performs the effect of following a change in temperature sufficiently, on condition that a radius of an external circle is a value from 3 μm to 20 μm, a radius of an internal circle from 2 μm to 15 μm, a cross section area from 4 μm² to 140 μm², a height average from 3 μm to 20 μm, and the dispersion density from 5/mm² to 2000/mm².

The above-mentioned values apply to the case of using a negative resist comprising an acryl-based polymer compound for the spacer material. As described later, since similar ideas to the above-mentioned case of an acryl-based polymer compound apply also to the case of using other materials for the spacer material, the spacer performs the effect of following a change in temperature sufficiently similarly to the above, on condition that the shape and the dispersion density of the spacer are determined in a range of appropriate values.

Figure 6:
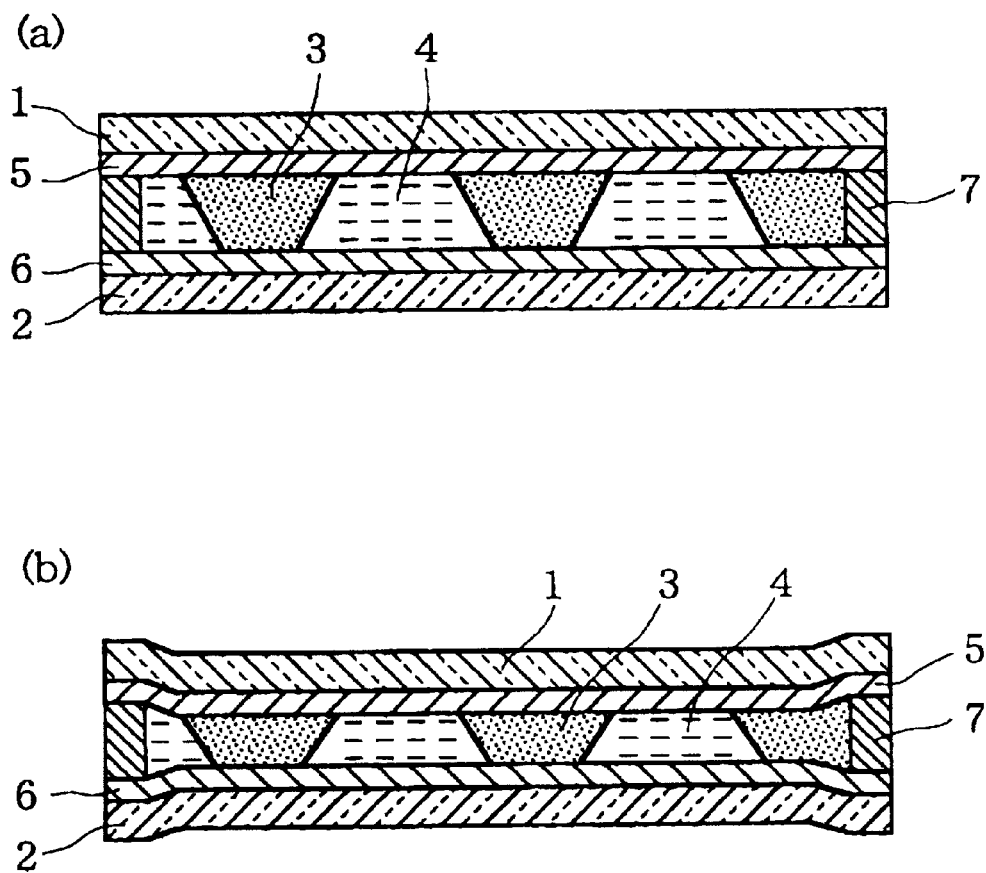
FIG. 6 is a view for describing a state in which a liquid crystal display element according to Embodiment 1 was shifted from an environment of room temperature to a temperature of −20° C.

Next, the liquid crystal display element manufactured in the above-mentioned method was shifted from an environment of room temperature to a temperature of −20° C. This is described referring to FIG. 6. FIG. 6(a) shows the liquid crystal display element at room temperature. In this state, all or a part of the spacers were deformed elastically. FIG. 6(b) is a view showing the liquid crystal display element at the low temperature. The thickness of the liquid crystal layer 4 was contracted due to the volume contraction at the low temperature. In Embodiment 1, since the spacer 3 had elasticity and can follow the contraction of the liquid crystal layer 4, the low-temperature foaming phenomenon did not occur at the low temperature.

Figure 7:
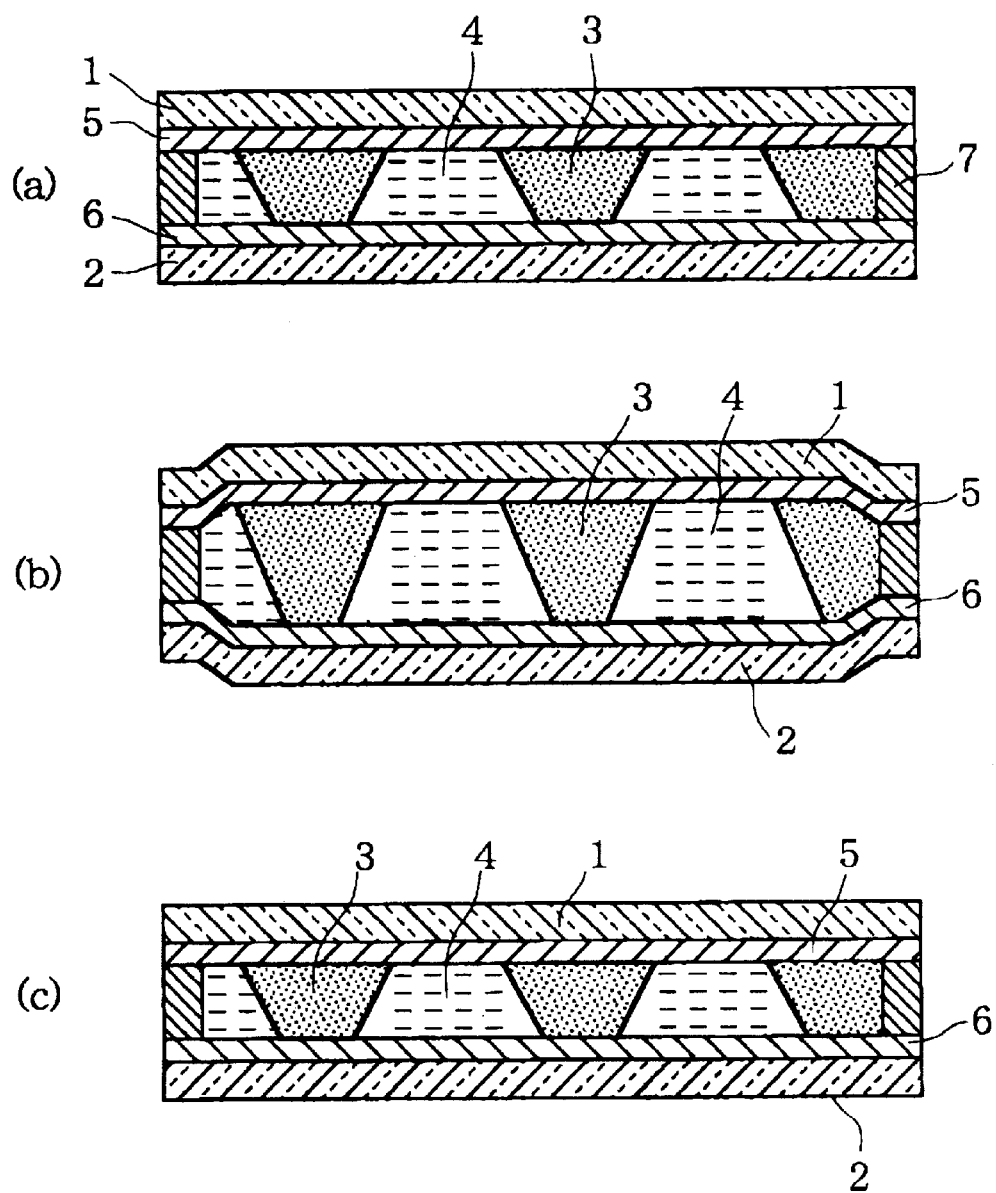
FIG. 7 is a view for describing a state in which a liquid crystal display element according to Embodiment 1 was shifted from an environment of room temperature to a high temperature of 40° C.

Furthermore, the liquid crystal display element manufactured in the above-mentioned method was shifted from an environment of a temperature of 20° C. to a high temperature of 40° C. This is described referring to FIG. 7. A change in structure of a liquid crystal display element according to the present invention due to an abrupt change in temperature is described below referring to FIGS. 7(a), (b) and (c)

First, FIG. 7(a) shows the liquid crystal display element at normal temperature (20° C. in Embodiment 1). In this state, the difference between atmospheric pressure and a pressure (hereinafter referred to as 'an internal pressure of a liquid crystal layer 609') of the liquid crystal layer 4 on the substrates 1, 2 was added to two glass substrates 1, 2 from outside, and consequently the spacer 3 was compressed.

FIG. 7(b) shows the liquid crystal display element at normal temperature in FIG. 7(a), which is heated to an upper limit of usable temperatures. In this state, the internal pressure of the liquid crystal layer 4 increases by heating.

In Embodiment 1, the coefficient of linear expansion of the spacer 3 is 7.0 to 10.0×10⁻⁵ (1/K) and the coefficient of linear expansion of a liquid crystal material of the liquid crystal layer 4 is 7.0×10⁻⁴ (1/K. An increase in the internal pressure of the liquid crystal layer 4 by heating depends on the expansion of the liquid crystal molecule.

Figure 8:
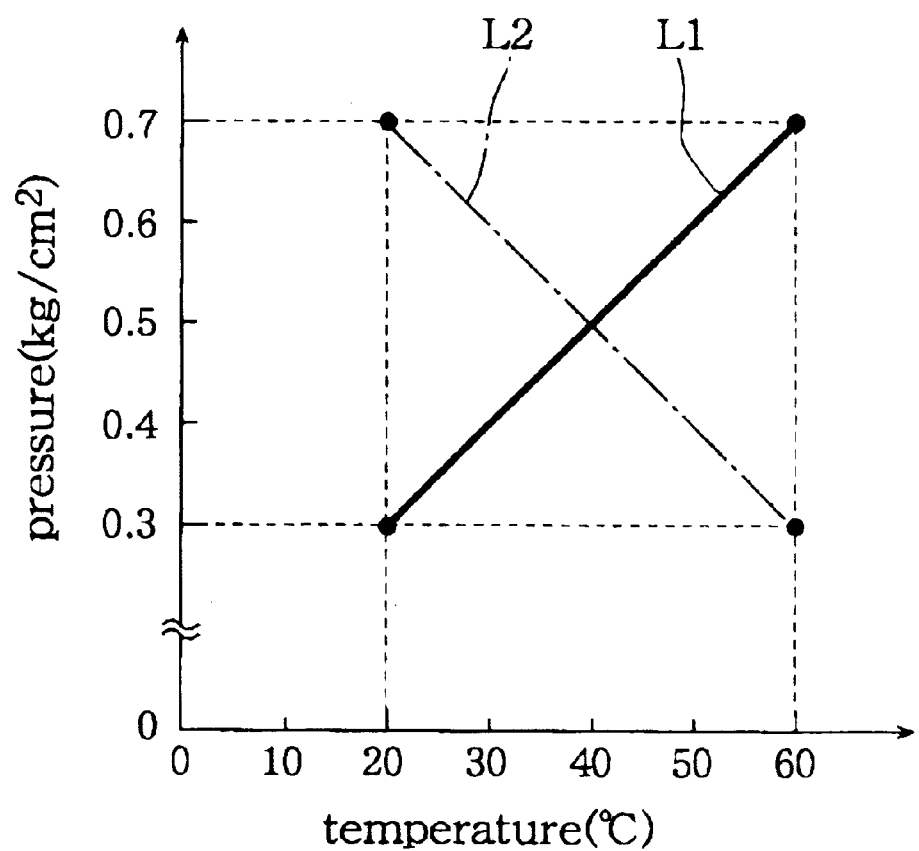
FIG. 8 is a graph showing a relation between the internal pressure Pi of the liquid crystal layer and the repulsion force Pr of the spacer, in the case where the temperature of a liquid crystal display element according to Embodiment 1 is heightened and lowered in a predetermined range of temperatures under constant atmospheric pressure.

FIG. 8 shows an example of a relation between the internal pressure Pi of the liquid crystal layer 4 and the repulsion force Pr of the spacer 3, in the case where the temperature of the liquid crystal display element is heightened and lowered in a predetermined range of temperatures under constant atmospheric pressure. In FIG. 8, atmospheric pressure is 1.0 kgf/cm². The horizontal axis indicates a temperature T in a range of 20 to 60° C. The vertical axis indicates a pressure P in a range of 0.3 to 0.7 kgf/cm². A solid line L1 indicates a pressure added to the liquid crystal layer 4, namely, the internal pressure Pi of the liquid crystal layer 4. A chain line L2 indicates a pressure added to the spacer 3, namely, the repulsion force Pr of the spacer 3 per unit area. The repulsion force of the spacer 3 per unit area is hereinafter referred to merely as 'the repulsion force Pr of the spacer'.

The internal pressure Pi of the liquid crystal layer 4 and the repulsion force Pr of the spacer 3 exist in the above-mentioned range of temperatures, and it is found that the sum of both is equal to atmospheric pressure. That is, the liquid crystal display element is opposed to atmospheric pressure by the internal pressure Pi of the liquid crystal layer 4 and the repulsion force Pr of the spacer 3.

When the internal pressure Pi of the liquid crystal layer 4 increases in proportion to a rise in temperature, the repulsion force Pr of the spacer 3 decreases, while the spacer 3 has the repulsion force Pr constantly in a range (20 to 60° C.) of temperatures in Embodiment 1. That is, the compressed spacer 3 pushes up the glass substrates 1, 2 from inside by its repulsion force Pr in every spot inside the liquid crystal layer 4, and thereby maintains a state of the compression. Consequently, as shown in FIG. 7(b), the gap is equal except the peripheral part fixed by the sealing part 7.

FIG. 7(c) shows the liquid crystal display element at a high temperature in FIG. 7(b), which is cooled to normal temperature. As shown in FIG. 7(b), when the liquid crystal display element at a high temperature is cooled, the internal pressure Pi of the liquid crystal layer 4 decreases, while the repulsion force Pr of the spacer 3 increases. That is, the expanded liquid crystal layer 4 contracts while the glass substrates 1, 2 and the spacer 3 are touching constantly. Consequently, the liquid crystal layer 4 contracts uniformly as a whole without any difference in a degree of the contraction between spots. As a result, even in the case of lowering the high temperature, the liquid crystal display element returns completely to the initial state FIG. 7(a)), as shown in FIG. 7(c).

Figure 14:
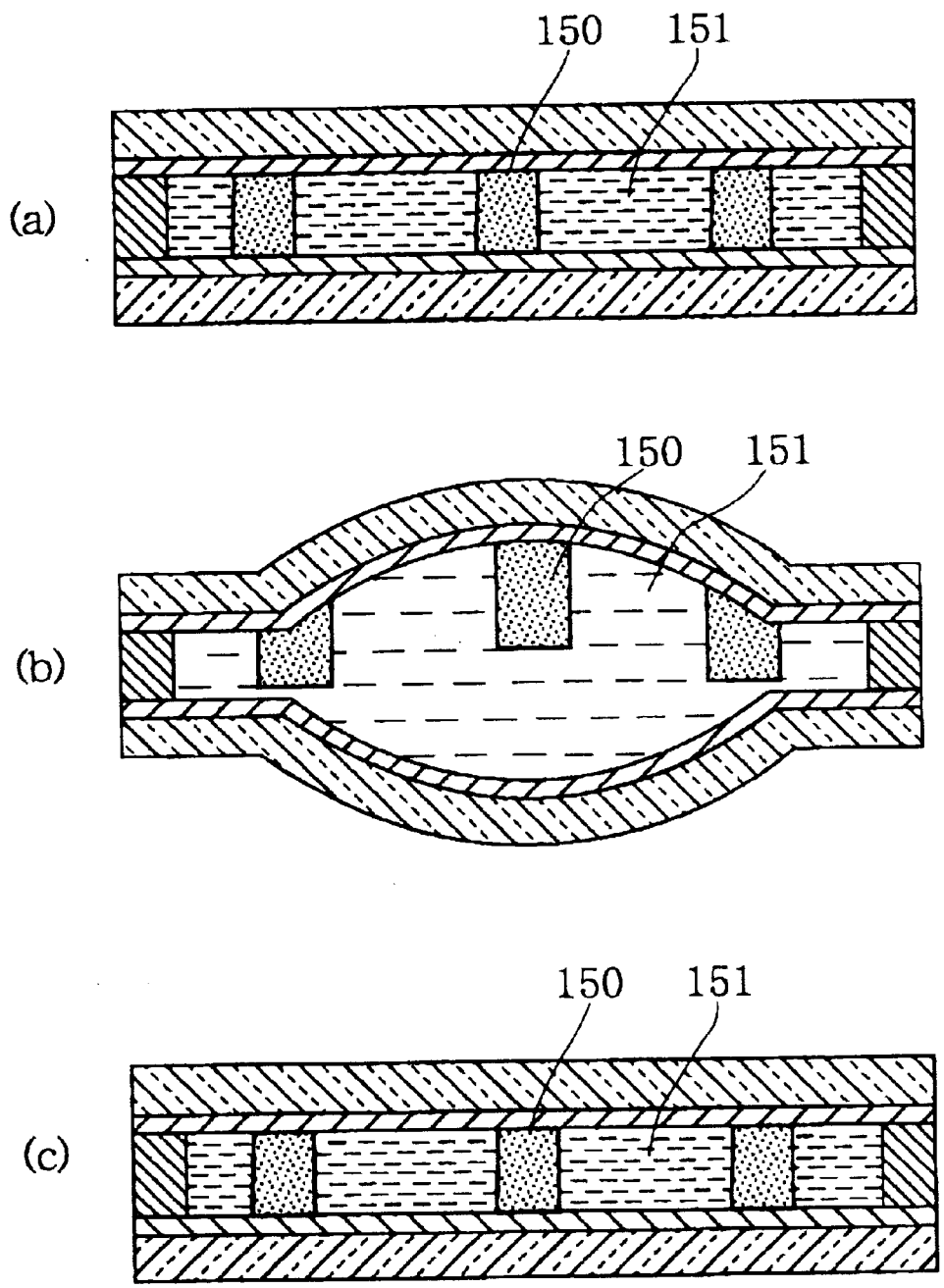
FIG. 14 is a view for describing a state in which a liquid crystal display element according to a comparative example of Embodiment 1 was shifted from an environment of room temperature to a high temperature of 40° C.
Figure 15:
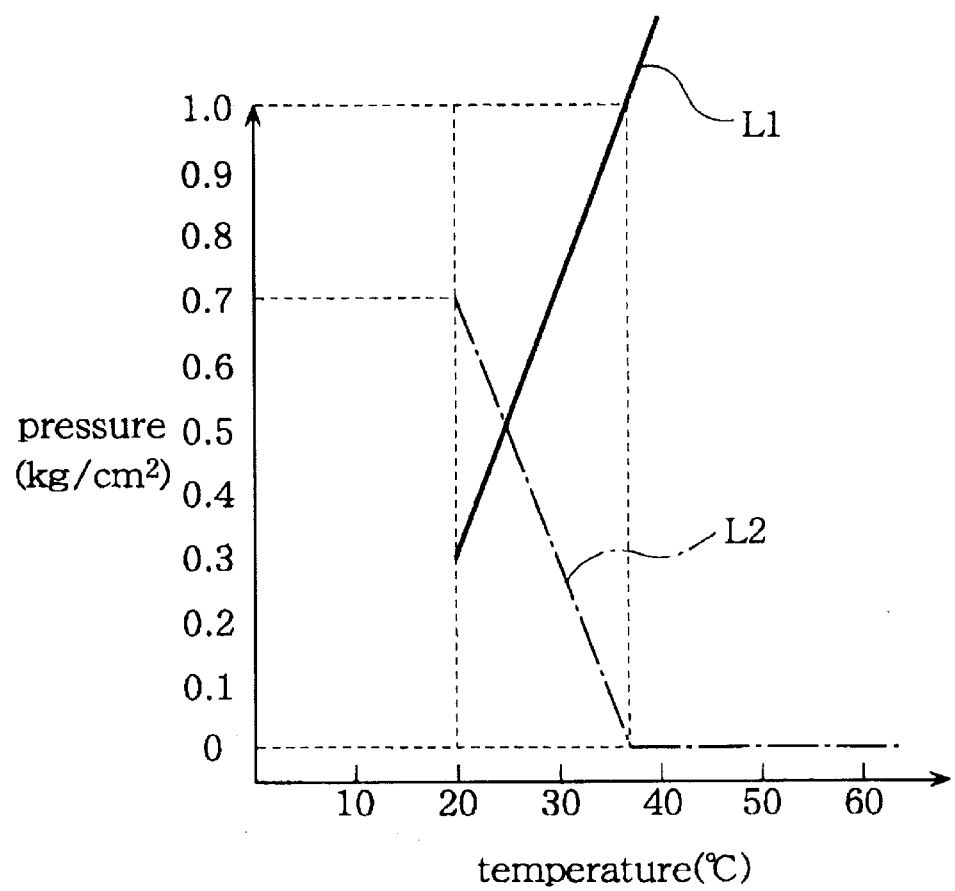
FIG. 15 is a graph showing a relation between the internal pressure Pi of the liquid crystal layer and the repulsion force Pr of the spacer, in the case where the temperature of a liquid crystal display element according to a comparative example of Embodiment 1 is heightened and lowered in a predetermined range of temperatures under constant atmospheric pressure.

FIG. 14 shows a state of a spacer against a change in temperature of a liquid crystal display element in the case of using a firm spacer 150 with little elastic deformation, as a comparative example of Embodiment 1. FIG. 15 shows a relation between the internal pressure of a liquid crystal layer 151 and the repulsion force of the spacer 150 in the comparative example. The spacer 150 can not follow the expansion of the liquid crystal layer 151 at a high temperature, and the middle part of a substrate bends greatly. Therefore, the grade of display deteriorates.

This is shown in FIG. 15. That is, the repulsion force of the spacer decreases abruptly with a rise in temperature and reaches a value of 0 over a certain temperature. This means that most of the spacers are detached from the substrate. The middle part expands under the influence of tension for joining the substrates together at a higher temperature than the temperature. The internal pressure of the liquid crystal layer continues to increase with a rise in temperature. Therefore, a range of usable temperatures is narrow in the comparative example, and it is understood that it is necessary to provide elasticity for the spacer in order to widen the range of usable temperatures.

Thus, in Embodiment 1, as far as the spacer 3 is compressed elastically, it is possible to prevent the deformation of the gap between two glass substrates due to a change in temperature, namely, the nonuniformity of the thickness Tc of the liquid crystal layer. In addition, the range of temperatures is 20 to 60° C. in the above-mentioned description, while it is verified that the spacer can follow in a range of temperatures of 0 to 85° C. according to the experiments by the inventors of the present invention. Accordingly, as far as the internal pressure Pi of the liquid crystal layer 4 and the repulsion force Pr of the spacer 3 exist and the sum of both is equal to atmospheric pressure, the effect of the present invention is obtained. For instance, a liquid crystal display element needs to have no occurrence of spots in a range of usable temperatures, which is different according to uses of the liquid crystal display element. The range of usable temperatures is comparatively high in uses for car navigation system inside cars, and the liquid crystal display element can be used for car navigation system by optimizing the elasticity, the dispersion density and the pressure of the spacer. In addition to this, the liquid crystal display element can be used similarly in each range of usable temperatures for uses for notebook personal computer, personal computer monitor, projection display, portable information terminal, portable telephone, and reflection type liquid crystal television monitor.

Consequently, no nonuniformity of the cell thickness was caused. Neither was display spottiness caused.

An action mode of a liquid crystal display element in the present invention may be any of action modes in which a molecule array can be controlled by electric field, and among them, IPS (In-Plane Switching) mode requiring a precise control over the cell thickness, TN mode, STN (Super Twisted Nematic) mode and ferroelectric liquid crystal mode have a particular effect. A display mode of a liquid crystal display element can employ either of a normally black (NB) mode having a black display with no transmission of light, and a normally white NW) mode having a white display with a transmission of light, under no application of voltage. The dispersion density of spacers is approximately $300/mm^2$ in Embodiment 1, and can be approximately 10 to $2000/mm^2$ similarly. Then, as the dispersion density becomes higher, the stress in elastic deformation needs to be smaller. Basically, the stress of the spacer is in inverse proportion to the dispersion density on condition that an average and a variance in height of the spacer are equal to their counterparts. With the dispersion density of 5 or less/$mm^2$, in order to maintain a uniform cell thickness, the spacer is hardly deformed in applying the stress and has little follow-up, whereby the low-temperature foaming phenomenon and the nonuniformity of the cell thickness at a high temperature are caused. Thus, a certain dispersion density is necessary for maintaining a fine grade of display. Meanwhile, with the dispersion density of 2000 or more/$mm^2$, since it is difficult to form the spacer in the present situation, the spacer is unfeasible. It is effective to form two or more kinds of spacers with a different length in a normal direction to a substrate for the purpose of obtaining the follow-up. Moreover, it is effective to form two or more kinds of spacers with a different elasticity in the substrate plane.

In Embodiment 1, the gap between substrates is pressed equally at a pressure of 0.3 kgf/$cm^2$ in the step of sealing a liquid crystal material between the substrates, in order that the whole or a part of the spacer is deformed elastically. For instance, the equal pressure can be 0.1 to 1.0 kgf/$cm^2$ similarly by optimizing the elasticity and the dispersion density of the spacer.

Furthermore, an elastic action of the spacer is described in Embodiment 1 by using a pressure value on a panel, and may be described by a value of the internal pressure of the liquid crystal layer 4 inside a liquid crystal display element. Then, a possible value of the internal pressure of the liquid crystal layer 4 is approximately 0.1 to 1.0 kgf/$cm^2$ similarly. Since the cell thickness can not follow an action of the liquid crystal layer 4 beyond a range of the values, it is unfeasible.

A negative type resist comprising an acryl-based polymer compound was used as a spacer material in Embodiment 1. In addition to this, any of a polystyrene-based polymer compound, an acryl-based polymer compound, a polyester-based polymer compound, a silicon-based polymer compound, a polycarbonate-based polymer compound, a polysiloxane-based polymer compound, a polyethylene-based polymer compound, and a polyurethane-based polymer compound may be used. It is possible to use a copolymer or a polymer alloy compound mixing two or more kinds of compounds among the above-mentioned compounds.

In Embodiment 1, the spacer was formed directly by executing photolithography on the glass substrate with the above-mentioned material. For instance, the spacer may be formed by pressing on the plastic substrate consisting of the above-mentioned compounds.

In Embodiment 1, the case of using the glass substrate was described. An a-Si TFT substrate using an amorphous silicon thin film as a switching element, a built-in driver type polysilicon TFT substrate, a low-temperature polysilicon TFT substrate by ELA, a high-temperature polysilicon TFT substrate by a thermal annealing, a polysilicon TFT substrate by crystallizing a metallic catalyst in another method, and a two-terminal type active matrix substrate with a thin film diode TFD may be used.

The spacer may be formed in an area of shielding in a pixel part of a color filter. Then, the spacer may have a sufficient elasticity to follow the contraction of a liquid crystal molecule during a change in temperature from room temperature to low temperature.

Embodiment 2

Figure 9:
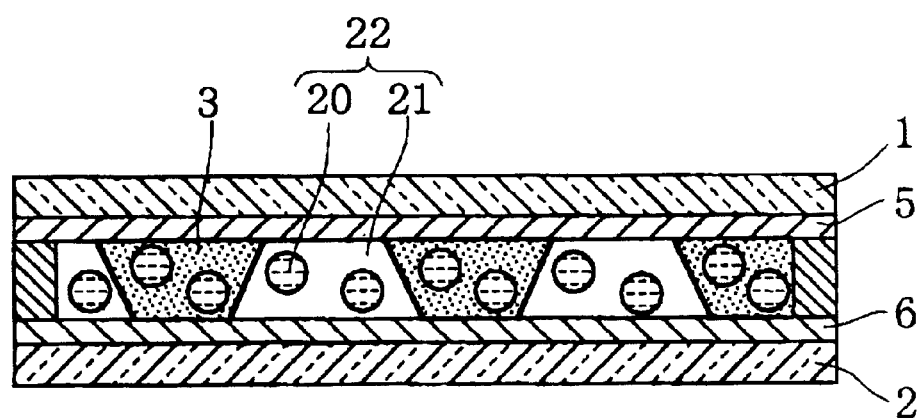
FIG. 9 is a cross sectional view of a liquid crystal display element according to Embodiment 2.

FIG. 9 is a cross sectional view of a liquid crystal display element according to Embodiment 2. Embodiment 2 is characterized by using a polymer dispersed liquid crystal display element comprising a polymer dispersed liquid crystal layer 22, composed of a liquid crystal 20 and a polymer matrix 21, instead of the liquid crystal layer 4 The polymer matrix 21 is a polymer having a structure in a three-dimensional network. The liquid crystal 20 is a liquid crystal dispersed in a droplet into the polymer matrix 21 or a liquid crystal having a structure in a network wherein the liquid crystal dispersed in a droplet is connected with each other. A volume ratio of the liquid crystal 20 to the polymer matrix 21 is approximately 4 to 1.

In such a polymer dispersed liquid crystal display element, the low-temperature foaming phenomenon does not occur unlike a TN type liquid crystal display element, an STN type liquid crystal display element and a ferroelectric type liquid crystal display element. However, the problem is that a display spottiness at a high temperature occurs more markedly because of a low flowability of a liquid crystal. In order to solve this problem, a polymer dispersed liquid crystal display element according to Embodiment 2 had a constitution using a similar column-shaped spacer 3 to Embodiment 1. Consequently, in a polymer dispersed liquid crystal display element used for a projection display, it was possible to maintain a fine grade of display with a uniform cell thickness in a range of usable temperatures from 10° C. to 50° C. In a polymer dispersed liquid crystal display element used for a reflection type liquid crystal display, it was possible to maintain a fine grade of display with a uniform cell thickness in a range of usable temperatures from 10° C. to 35° C. The manufacture of the polymer dispersed liquid crystal layer 22 is similar to that of an ordinary polymer dispersed liquid crystal layer. That is, after filing up a gap between a pair of substrates with a composite material of a polymer precursor and a liquid crystal material by a vacuum injecting, the polymer dispersed liquid crystal layer 22 is obtained by polymerizing the polymer precursor with heating or irradiation of ultraviolet rays and phase-separating the liquid crystal and the polymer.

The glass substrate with the transparent electrode was used in Embodiment 2. A column-shaped or nonglobular spacer may be formed in an area of shielding on an active matrix substrate with a switching element by using a similar method. An amorphous TFT substrate, a built-in driver circuit type high-temperature process polysilicon TFT substrate, a low-temperature process polysilicon TFT substrate, a polysilicon TFT substrate by crystallizing in such another method as catalysis method, and a two-terminal type active matrix substrate, typically a thin film diode TFD, may be used as an active matrix substrate by a simultaneous use with a flattening process.

In a projection display type, such a color separating means utilizing multilayer film interference as a dichroic mirror is occasionally used without using a color filter. Consequently, a liquid crystal display element with a fine grade of display having little unevenness on a screen in consideration of a high contrast and a high gray scale can be obtained by forming the column-shaped or nonglobular spacer on an opposite substrate correspondingly to an area of shielding light on an active matrix substrate with TFT, such as a gate signal line, a source signal line, or an intersection of them and a TFT part.

Embodiment 3

Figure 10:
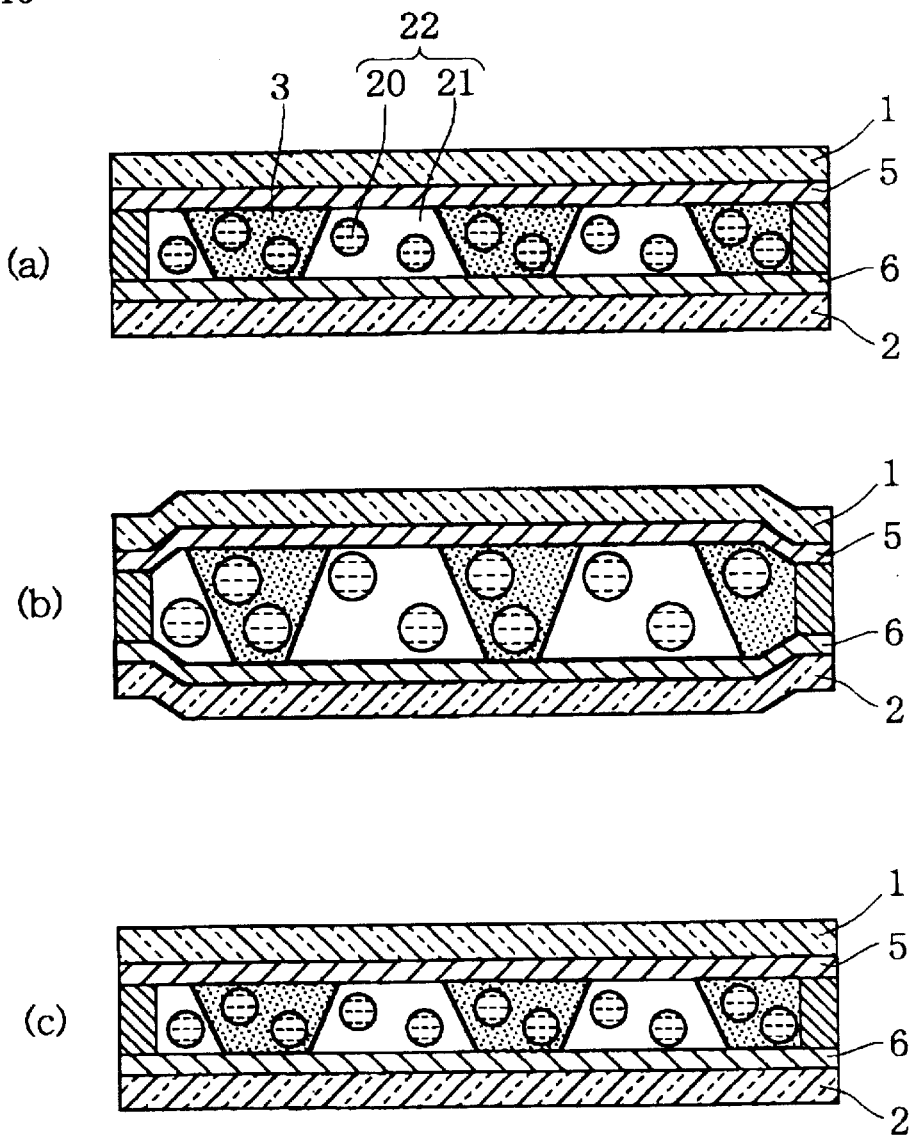
FIG. 10 is a view showing a state of changes of a spacer in a range of storage temperatures in a liquid crystal display element according to Embodiment 3.

FIG. 10 is a cross sectional view of a liquid crystal display element according to Embodiment 3. The liquid crystal display element in Embodiment 3 has a similar constitution to the polymer dispersed liquid crystal display element described in Embodiment 2. Ordinarily, in a polymer dispersed liquid crystal display element, the unevenness of display due to the nonuniformity of thickness occurs when the elasticity of a spacer is low. The reason is that a polymer dispersed liquid crystal display element has an extremely low flowability of a liquid crystal molecule, and can not return to an initial state during an abrupt change in temperature from storage at a high temperature. Consequently, it is necessary to compensate the uniformity merely in a range of usable temperatures in Embodiment 1, while it is necessary to compensate the uniformity in a range of storage temperatures in a polymer dispersed liquid crystal display element. In order to solve the above-mentioned problem, the polymer dispersed liquid crystal display element according to Embodiment 3 is constituted so that elasticity is provided for the spacer by a method described in Embodiment 1, and a much greater elastic force than Embodiment 2 is provided for the spacer in terms of compensating the uniformity in a range of storage temperatures. For instance, a tip of a spacer in circular cone is made thinner than Embodiment 2, and an area of a hollow part in a cross section of a hollow spacer is made larger. A range of usable temperatures means a temperature of peripheral environment in actually using (displaying) a display device wherein a liquid crystal display element is installed, while a range of storage temperatures means a temperature of peripheral environment in storing a display device wherein a liquid crystal display element is installed. Accordingly, a range of storage temperatures is generally a wider range of temperatures than a range of usable temperatures. The manufacture of the polymer dispersed liquid crystal layer 22 is similar to that of an ordinary polymer dispersed liquid crystal layer. That is, after filling up a gap between a pair of substrates with a composite material of a polymer precursor and a liquid crystal material by a vacuum injecting, the polymer dispersed liquid crystal layer 22 is obtained by polymerizing the polymer precursor with heating or irradiation of ultraviolet rays and phase-separating the liquid crystal and the polymer.

The concrete contents of a liquid crystal display element according to Embodiment 3 is detailed below.

A change in structure of a liquid crystal display element according to the present invention due to an abrupt change in temperature is described below referring to FIGS. 10(a), (b) and (c).

First, FIG. 10(a) shows the liquid crystal display element at normal temperature (20° C. in Embodiment 3). In this state, the difference between atmospheric pressure and a pressure (hereinafter referred to as 'an internal pressure of a liquid crystal layer') of a composite layer 22 on the glass substrates 1, 2 was added to two glass substrates 1, 2 from outside, and consequently the spacer 3 was compressed.

FIG. 10(b) shows the liquid crystal display element at normal temperature in FIG. 10(a), which is heated to a high temperature (85° C. in Embodiment 3). In this state, the internal pressure of the liquid crystal layer increases by heating. In Embodiment 3, the coefficient of linear expansion of the spacer 3 is 7.0 to $10.0 \times 10^{-5}$ (1/K), the coefficient of linear expansion of a liquid crystal material is $7.0 \times 10^{-4}$ (1/K), and the coefficient of linear expansion of the polymer matrix 21 is equal to or less than that of the spacer 3. A volume ratio of the liquid crystal 20 to the polymer matrix 21 in the liquid crystal layer 22 is approximately 4 to 1. Consequently, since the expansion of the spacer 3 and the polymer matrix 21 is nearly negligible, an increase in the internal pressure of the liquid crystal layer by heating depends on the expansion of the liquid crystal 20.

Figure 11:
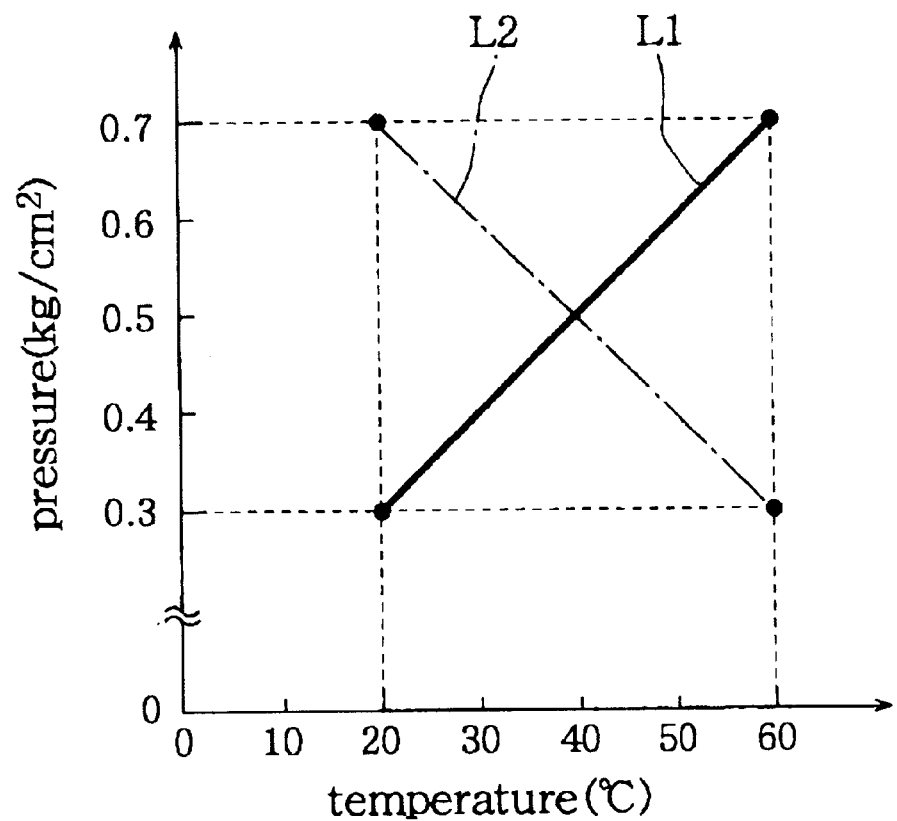
FIG. 11 is a graph showing a relation between the internal pressure Pi of the liquid crystal layer and the repulsion force Pr of the spacer, in the case where the temperature of a liquid crystal display element according to Embodiment 3 is heightened and lowered in a predetermined range of temperatures under constant atmospheric pressure.
Figure 12:
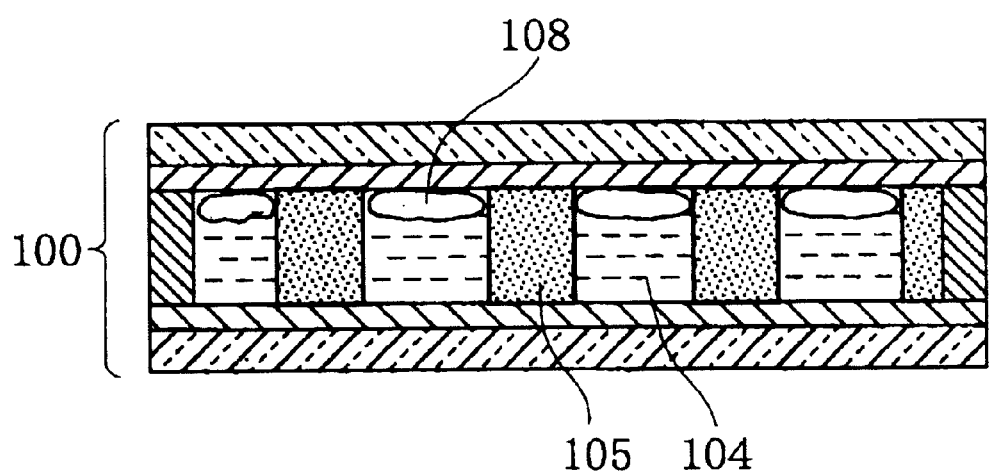
FIG. 12 is a view for describing a low-temperature foaming phenomenon in a conventional liquid crystal display element.
Figure 13:
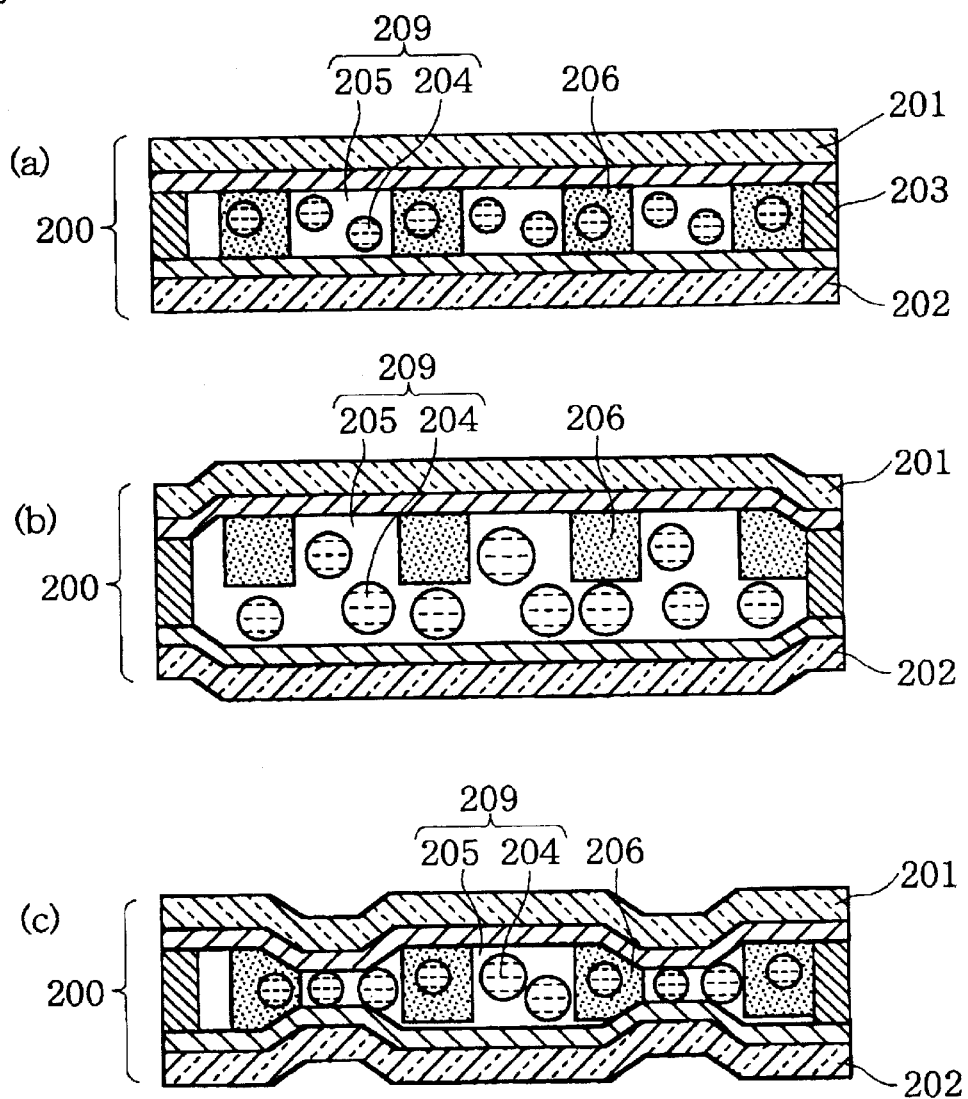
FIG. 13 is a view showing the deformation of the gap between the substrates (the nonuniformity of the thickness of the liquid crystal layer) in a conventional polymer dispersed liquid crystal display element.

FIG. 11 shows an example of a relation between the internal pressure Pi of the liquid crystal layer and the repulsion force Pr of the spacer 3, in the case where the temperature of the liquid crystal display element is heightened and lowered in a predetermined range of temperatures under constant atmospheric pressure. In FIG. 11, atmospheric pressure is 1.0 kgf/cm$^2$. The horizontal axis indicates a temperature T in a range of 20 to 60° C. The vertical axis indicates a pressure P in a range of 0.3 to 0.7 kgf/cm$^2$. It is verified to give a linear characteristic similar to FIG. 11 in a range of temperatures of 0 to 85° C. (pressures of 0.1 to 0.9 kgf/cm$^2$) according to the experiments by the inventors of the present invention. In FIG. 11, A solid line L1 indicates a pressure added to the liquid crystal layer, namely, the internal pressure Pi of the liquid crystal layer. A chain line L2 indicates a pressure added to the spacer 3, namely, the repulsion force Pr of the spacer 3 per unit area. The repulsion force of the spacer 3 per unit area is hereinafter referred to merely as 'the repulsion force Pr of the spacer 3'.

The internal pressure Pi of the liquid crystal layer and the repulsion force Pr of the spacer 3 exist in the above-mentioned range of temperatures, and it is found that the sum of both is equal to atmospheric pressure. That is, the liquid crystal display element is opposed to atmospheric pressure by the internal pressure Pi of the liquid crystal layer and the repulsion force Pr of the spacer 3.

When the internal pressure Pi of the liquid crystal layer increases in proportion to a rise in temperature, the repulsion force Pr of the spacer 3 decreases, while the spacer 3 has the repulsion force Pr constantly in a range of storage temperatures of 20 to 60° C. in Embodiment 3 (similarly in a range of temperatures of 0 to 85° C.). That is, the compressed spacer 3 pushes up the glass substrates 1,2 from inside by its repulsion force Pr in every spot inside the liquid crystal layer 22, and thereby maintains a state of the compression. Consequently, as shown in FIG. 10(b), the gap is equal except the peripheral part fixed by the sealing part 7.

FIG. 10(c) shows the liquid crystal display element at a high temperature in FIG. 10(b), which is cooled abruptly to normal temperature. As shown in FIG. 10 (b), when the liquid crystal display element at a high temperature is cooled, the internal pressure Pi of the liquid crystal layer decreases, while the repulsion force Pr of the spacer 3 increases. That is, the expanded liquid crystal layer 22 contracts while the glass substrates 1, 2 and the spacer 3 are touching constantly. Consequently, the liquid crystal layer 22 contracts uniformly as a whole without any difference in a degree of the contraction between spots. As a result, even in the case of lowering the high temperature abruptly, the liquid crystal display element returns completely to the initial state (FIG. 10(a)), as shown in FIG. 10 (c).

Since the moving speed of a liquid crystal molecule in a polymer matrix is low in a polymer dispersed liquid crystal without using an elastic body for the spacer, the liquid crystal does not return to the initial state when lowered to room temperature, and the middle part becomes thick while the periphery of the main sealing part becomes thin. As a result, display spottiness is caused When the temperature of the liquid crystal display element is lowered to a low temperature (for instance, 0° C.), the thickness Tc of the liquid crystal layer decreases. In this case, a certain thickness Tc of the liquid crystal layer 22 is maintained by the repulsion force Pr of the spacer 3 as shown in FIG. 10. The internal pressure Pi of the liquid crystal layer exists even at a low temperature, and the liquid crystal display element is opposed to atmospheric pressure by the internal pressure Pi of the liquid crystal layer and the repulsion force Pr of the spacer 3.

As described above, as far as the spacer 3 is compressed elastically, it is possible to prevent the deformation of the gap between two glass substrates due to a change in temperature, namely, the nonuniformity of the thickness Tc of the liquid crystal layer. In Embodiment 3, the liquid crystal display element is described as a transmission type liquid crystal display element wherein both of a pair of substrates are a transparent glass substrate with a transparent electrode. In addition to Embodiment 3, a reflection type liquid crystal display element having the effect of the present invention can be constituted if a reflective electrode for reflecting light is substituted for a transparent electrode.

In order to constitute a reflection type liquid crystal display element, it is possible to provide a reflective electrode divided at each pixel instead of the transparent electrode 6, and to supply voltage from a TFT element for the reflective electrode.

A range of temperatures in the above-mentioned description was 0 to 85° C. The effect of the present invention is obtained as long as the internal pressure Pi of the liquid crystal layer and the repulsion force Pr of the spacer 3 exist, and the sum of both is equal to atmospheric pressure. Therefore, a range of temperatures is not limited to the above.

The present invention is described above in detail. A PN (Polymer-Network) type, wherein a polymer is dispersed in a three-dimensional network or a micro droplet into a liquid crystal having a continuous phase, may be used as a mode of a liquid crystal and a polymer matrix in a polymer dispersed liquid crystal display element, instead of an NCAP (Nematic-Curvilinear-Aligned-Phase) type, wherein a liquid crystal droplet is dispersed into a polymer matrix, as described in Embodiment 3.

A liquid crystal display element was filled with a composite material of a polymer precursor and a liquid crystal material by a vacuum injecting in the above-mentioned Embodiment. A similar effect is obtained by injecting a composite material of a polymer precursor and a liquid crystal material into a liquid crystal display element under normal pressure.

A spacer with elasticity is formed on at least one of substrates with a transparent electrode for maintaining a certain cell thickness between a pair of substrates in the above-mentioned Embodiments 1 to 3. A spacer may be formed in an area of shielding on an active matrix substrate with a switching element by using a similar method. An amorphous TFT substrate, a built-in driver circuit type high-temperature process polysilicon TFT substrate, a low-temperature process polysilicon TFT substrate, a polysilicon TFT substrate by crystallizing in such another method as catalysis method, and a two-terminal type active matrix substrate, typically a thin film diode TFD, may be used as an active matrix substrate by a simultaneous use with a flattening process.

In the above-mentioned Embodiments 1 to 3, although the spacer is constituted so as to follow an abrupt change from room temperature to low temperature as well as from room temperature to high temperature, the spacer may be constituted so as to follow an abrupt change either from room temperature to low temperature or from room temperature to high temperature.

What is claimed is:

1. A liquid crystal display element comprising:
    a spacer located between a pair of substrates for maintaining a gap between the substrates;
    a liquid crystal layer sealed between the substrates, said layer comprising liquid crystal material and a polymer, wherein
        said spacer comprises elastically deformable material whose elasticity is such that a sum of a force causing elastic deformation of said spacer and a counterveiling internal pressure of said liquid crystal layer confined by maid spacer and substrates is constantly approximately equal to atmospheric pressure throughout changes in temperature within a range of storage temperatures of the liquid crystal display element,
        said spacer is located directly on at least one of said pair of substrates, and
        said spacer structure is at least partially hollow.

* * * * *